Feb. 2, 1960 H. B. IMBODEN ET AL 2,923,150
TENSION MEASURING APPARATUS
Filed Dec. 16, 1957 2 Sheets-Sheet 2

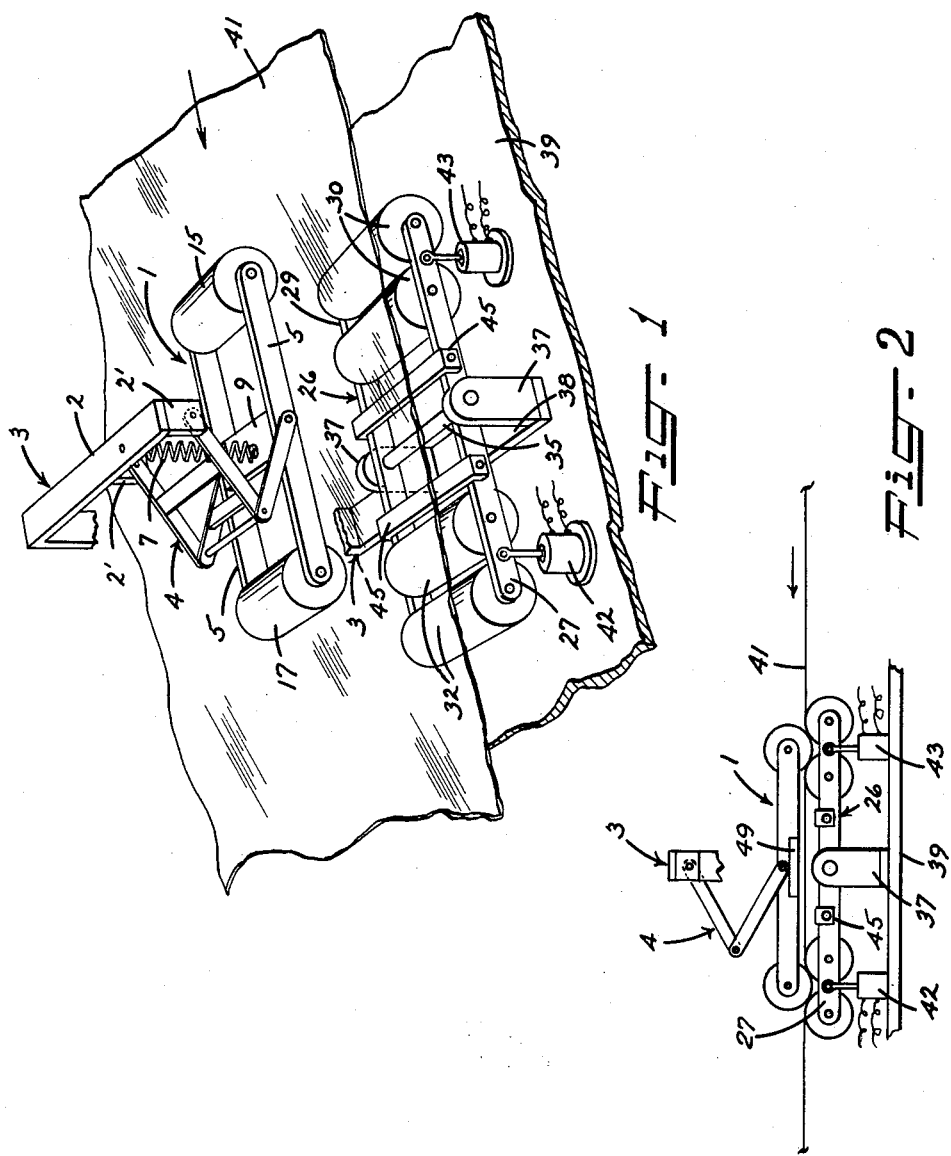

United States Patent Office 2,923,150
Patented Feb. 2, 1960

2,923,150

TENSION MEASURING APPARATUS

Herbert B. Imboden, Media, and David P. Sigley, Brookhaven, Pa., assignors to American Viscose Corporation, Philadelphia, Pa., a corporation of Delaware Application December 16, 1957, Serial No. 702,839

8 Claims. (Cl. 73—143)

The present invention relates to an apparatus for measuring tension in a traveling flexible sheet material. In particular, the invention relates to an apparatus for measuring continuously the tension in a traveling sheet material from a single station.

One object of our invention is to provide a novel and improved apparatus for measuring tension in a moving film at a point along the path of travel of the film.

Another object of our invention is to provide a novel and improved apparatus for measuring the tension in a traveling film wherein both the longitudinal and transverse strains occurring in the traveling film may be measured with only a slight change in the setting of the apparatus.

Still another object of our invention is to provide a novel and improved apparatus for continuously measuring tension in a traveling sheet material wherein the apparatus may be easily removed and installed at different stations along the path of traveling material.

Other objects and advantages of our invention may become more apparent from a study of the following description and drawings wherein:

Figure 1 is a perspective view of our apparatus;

Figure 2 is a side view of our apparatus showing an embodiment of our invention;

Figure 3:
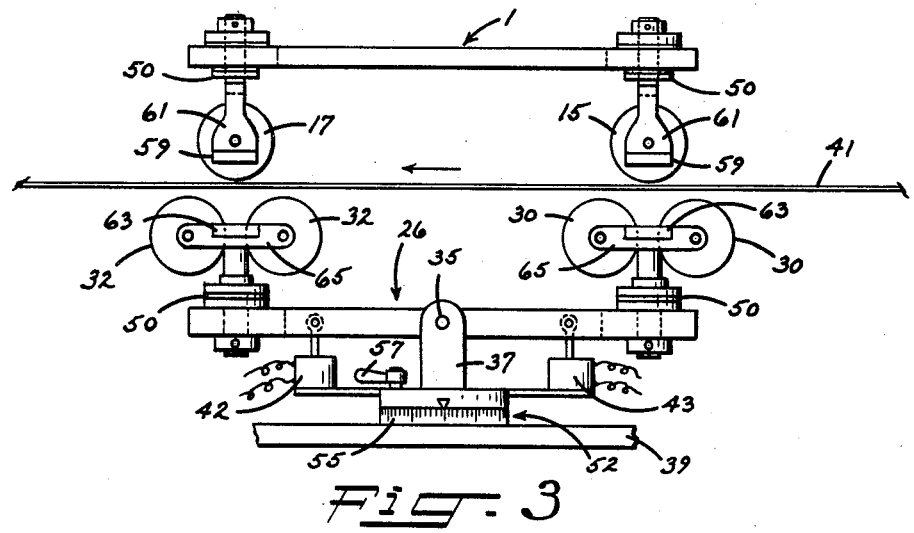
Figure 3 is a side view of our apparatus showing another embodiment of our invention.

Briefly, our apparatus includes an elongated lower frame which is adapted to be positioned on one side of the path of a traveling sheet material and which is pivotally supported at approximately its midpoint so that it may be rocked or oscillated. A second elongated frame adapted to be positioned on the opposite side of the traveling sheet material is suspended from a fixed support. Each frame has freely rotatable rollers at the opposite ends thereof with the opposing end rolls of the two frames being urged against one another by means connected with at least one of the frames whereby the sheet material is firmly nipped by the rollers as it travels between the frames. Means are connected with one of the frames to set up an oscillating or rocking motion for the frames as a unit.

The tension or strain within the sheet material being tested affects the rate or frequency of oscillation. Additional counting means are connected with the lower frame for determining the frequency of oscillation of the frames.

By comparing the frequency of oscillation for the traveling material being tested with frequencies of oscillation as determined from tests conducted upon a stationary sheet material wherein the tension was known, the operators may determine the amount or degree of tension present in the material being tested.

As seen in Figure 1 of the drawing, a first elongated upper frame 1 is connected to a horizontally extending upper arm 2 of a bracket support 3 through a hinged arm member 4. The hinged member 4 is pivotally secured to extensions 2', 2' depending from the overhead support 3 while the opposite end of the hinged member 4 is pivotally secured to elongated side members 5, 5 of the upper frame 1 at approximately their mid-point. Resilient means, preferably in the form of a helical spring 7, is connected at one end to the overhead support 3 and at its opposite end to a cross strut 9 lying between and connected with the side members 5, 5 of the upper frame 1. The purpose of the spring will be fully explained hereinafter. Supported at each end of the upper frame in the elongated side members 5, 5 are freely rotatable rollers 15 and 17.

A second lower frame 26 is formed of a pair of elongated side members 27 and 29 which support, at each end of the side members, a pair of rollers 30, 30 and 32, 32. As with the upper frame 1, these rollers are freely rotatable. As seen in Figure 1, the peripheries of each pair of rollers 30, 30 and 32, 32 lie in spaced-apart relationship with one another. The frame 26 is supported in a vertically pivotal fashion by shaft 35 supported in bearing mounts 37, 37 secured to the bottom horizontally extending arm 38 of the bracket support 3. As seen in the drawing, the shaft extends through the side members 27, 29 at approximately their mid-point. The bracket support 3 is secured to a permanent support 39. This support may be in the form of a table top which extends beyond the body portion of a movable table. The purpose of this extension of the table top will be explained more fully hereinafter. It should be point out that with a slight modification of the upper frame, only one roller is required at each end of the lower frame.

As further seen in Figure 1, the upper frame 1 is in its raised or non-operative position. To raise the upper frame to the position shown in the drawing, the operator merely grips the frame 1 lightly and urges it upwardly against the force exerted by the spring 7. The force exerted by the spring 7 is of such degree that when the frame 1 is released by the operator, it will descend into contact with the lower frame 26 with the upper rollers 15, 17 being urged against and between the peripheries of each pair of lower rollers 30, 30 and 32, 32 respectively to form a nipping relationship therewith as seen in Figure 2 of the drawing. The hinged arm member 4 maintains the upper frame 1 in true longitudinal alignment with the lower frame 26.

To lace up the material to be tested, the operator raises the upper frame 1 away from the lower frame and the movable table top support 39 is moved inwardly toward the sheet material 41, which may be continuously traveling cellophane, so that the upper frame 1 passes over the sheet material while the lower frame passes under the material. The operator then releases the upper frame whereupon the rollers of the upper frame are urged against the material and the rollers of the lower frame. The rollers are rotated by the sheet material passing between the upper and lower rollers. As mentioned above, the axis of each upper roller 15, 17 lies between the axes of a pair of the rollers mounted at each end of the lower frame. With this arrangement, the sheet material is firmly nipped by the rollers at each end of the frame make-up.

As mentioned in the brief description at the beginning of the specification, the frames are oscillated or rocked from their mid-point in a vertical plane as a single unit while the sheet material 41 is passing therebetween. To set up this pattern of oscillation of the frames, an oscillating actuator 42 such as a magnetic actuator of a solenoid type is secured to the elongated side member 27 of the lower frame 26 and to the table support 39. Through suitable circuits, intermittent signals are transmitted to the magnetic actuator 42 whereby the ends of the lower frame 26 will intermittently be raised and lowered as the frame pivots on the supporting shaft 35. Since the upper frame 1 is urged against the lower frame, it will follow the oscillation pattern of the lower frame. The tension in the running sheet material will tend to resist the oscillation of the frames. The rate or frequency of oscillation will vary according to the tension running in the sheet material being tested since the oscillating force exerted by the actuator is constant at all times. A high tension in the sheet material will produce a higher rate of oscillation while a low sheet material tension will produce a lower rate of oscillation of the frames as set up by the actuator 42.

To measure the frequency of this oscillation, an oscillation counter 43 such as a photoelectric-type motion detector is affixed to the opposite end of the side member 27 of the lower frame 26 and to the table-top support 39. The oscillation counter 43 may, however, be affixed to the upper frame. The detector includes either a pointer-dial arrangement or a graph-type recorder assembly for recording the rate of oscillation. To determine the tension within the sheet 41 traveling between the frames, the operator merely compares the oscillation frequency recording against oscillation readings recorded during standard runs of sheet samples in which the tension factor was predetermined and known.

To adjust the moment of inertia of the frames, bar weights 45, 45 are adjustably supported upon the side members 45, 45 of the lower frame. They may be moved along the side members as desired and anchored by set screws.

Another embodiment of our invention is shown in Figure 2 of the drawing. This embodiment is similar to that of Figure 1 except that the compression spring 7 has been omitted. Bar magnets 49 are secured to both of the elongated side members 5, 5 of the upper frame 1. The side members 27, 29 are formed of a material which is attracted by magnetic forces. The upper frame 1 will therefore be constantly urged against the lower frame 26 so that the rollers will nip the sheet material passing between the upper and lower frames. The magnetic attraction will maintain the upper frame 1 in alignment with the lower frame 26.

Figure 4:
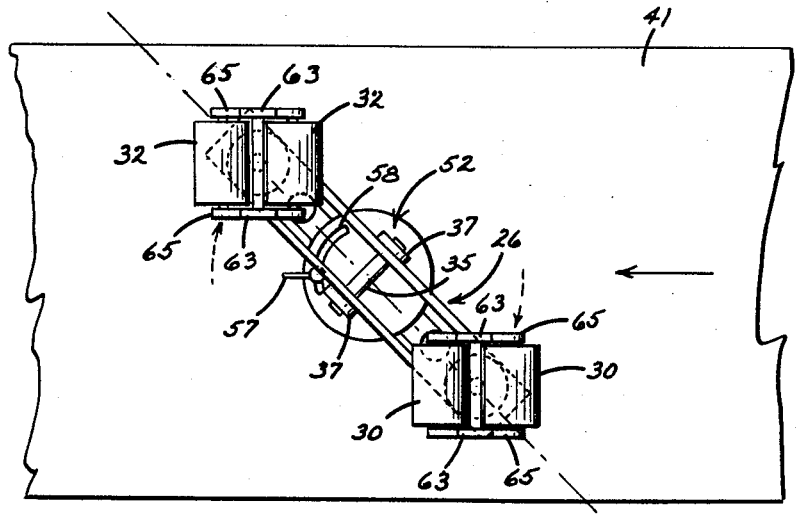
Figure 4 is a top view of a portion of the apparatus of Figure 3 showing the apparatus in a different position with respect to the traveling sheet material being tested.

Referring to Figures 3 and 4 of the drawing, another embodiment of our invention is shown which operates in a manner somewhat similar to the apparatus of Figures 1 and 2. With this embodiment, however, the operator may determine the strain or tension in a traveling sheet material in a longitudinal as well as a transverse direction (see Figure 4). As seen with this embodiment, each pair of rollers 30, 30 and 32, 32 of the lower frame 26 and rollers 15, 17 of the upper frame 1 are supported upon horizontally pivotal supports such as turntable assemblies 50, 50 suitably secured to each end of the frames.

In addition, a turntable-type support 52 is mounted upon a table-top support 39 and supports bearing plates 37, 37 for the shaft 35 of lower frame 26. With this arrangement, the entire lower frame may be rotated to the desired angle with respect to the direction of sheet material travel. As shown in Figure 3, suitable indicia 55 is provided to indicate the angular position of the lower frame 26 with respect to the direction of sheet travel. Lock nut 57 lying within swing slot 58 of the turntable assembly 52 is provided for locking the lower frame 26 in place when frame 26 is rotated to the desired angle of tension measurement by the operator. As seen more clearly in Figure 4, the rollers will have their axes at right angles to the direction of sheet travel regardless of the angular position of the frames since the moving sheet material will restrict their position to that shown in Figure 4 once having been so set. If desired, mechanical linkage may be secured to the turntable assemblies 50, 50 of the lower frame and to the table top 39 to provide automatic alignment of the rollers 30, 30 and 32, 32 with the direction of film travel.

As with the embodiment of Figure 2, the upper frame 1 is urged against the lower frame 26 by use of magnets. In this embodiment, however, magnets 59, 59 depend from the bearing supports 61, 61 for the upper frame rollers 15, 17 while magnets 63, 63 of opposite polarity are secured to the frame bearing supports 65, 65 for the bottom frame rollers 30, 30—32, 32. With this arrangement, the upper and lower frames are firmly urged together. The upper frame 1 is free from any supporting means whatsoever and may be freely handled by the operator. The magnets will maintain the upper frame 1 in longitudinal alignment with the lower frame 26.

The means used and the operation for setting up and recording the frequency of oscillation is the same as described with reference to the embodiment of Figure 1 of the drawing.

It should be pointed out that the table-top support 39 may be easily moved upon its table structure from one position and moved, as desired, to other positions along the path of the traveling material. With this advantage, the apparatus may be, in effect, termed a portable tension testing apparatus.

It should also be pointed out that the structure shown in Figure 2 of the drawing can be used satisfactorily without the hinged arm member 4 since the bar magnet 49 will maintain the upper frame 1 in alignment with the lower frame 26. In like manner, the upper frame 1 of the assembly of Figures 3 and 4 may be suspended from a bracket by a compression spring 7. In this case, the number of magnets may be minimized to the extent that they serve only as aligning means for the frames.

It is to be understood that changes and variations may be made without departing from the spirit and scope of the invention as defined in the appended claims.

We claim:

1. Apparatus for measuring tension in traveling sheet material comprising a first frame pivotally supported at approximately its mid-point on one side of the proposed path of travel of the sheet material whereby it may oscillate about its midpoint in a plane perpendicular to the plane of the sheet material, a second frame positioned on the other side of the proposed path of travel of the sheet material in such a manner that it may oscillate in a plane perpendicular to the plane of the sheet material, a freely rotatable roller supported at each end of said second frame, a pair of freely rotatable rollers having parallel axes with the roll peripheries slightly spaced apart from each other supported at each end of said first frame, means for urging said second frame against the first frame, said roll at each end of the second frame having its axis lying between the axes of one of the pairs of rolls at the opposing end of the first frame whereby when the frames are urged together the periphery of each of the rolls of said second frame is urged between and against the peripheries of one of the pair of rolls of the first frame to nip the sheet material passing therebetween, means to oscillate the frames as a unit when the rolls are in nip position, and means to measure the frequency of oscillation of the frames, the frequency of oscillation giving an indication of the tension in the travelling sheet.

2. Apparatus for measuring tension in traveling sheet material according to claim 1 wherein the means for urging the second frame against the first frame comprises at least one magnet.

3. Apparatus for measuring tension in traveling sheet material comprising a vertically disposed bracket, a lower frame pivotally supported at approximately its mid-point on the lower portion of the bracket below the proposed path of travel of the sheet material whereby it may oscillate in a vertical plane, resilient means secured to the upper portion of the bracket and extending downwardly therefrom, an upper frame suspended from the free end of the resilient means, a freely rotatable roller supported at each end of the upper frame, a pair of freely rotatable rollers having parallel axes with the roll peripheries slightly spaced apart from each other supported at each end of the lower frame, said upper frame being urged against the lower frame through the force exerted by the resilient support for the upper frame with said roll at each end of the upper frame having its axis lying between the axis of one of the pairs of rolls at the opposing ends of the lower frame whereby when the frames are urged together the periphery of each upper roll is urged between and against the peripheries of one of the pairs of rolls of the lower frame to nip the sheet material, means yieldingly connecting the upper frame with the upper portion of the bracket for maintaining the upper frame and its rolls in alignment with the lower frame, means to oscillate the frames as a unit when said rolls are in nip position, and means to measure the frequency of oscillation of the frame, the frequency of oscillation giving an indication of the tension in the travelling sheet.

4. Apparatus for measuring tension in traveling sheet material according to claim 3 wherein the upper frame alignment means comprises a hinged arm member secured to each side of the upper frame and to the bracket.

5. Apparatus for measuring tension in traveling sheet material according to claim 3 wherein the resilient support for the upper frame comprises a helical compression spring.

6. Apparatus for measuring tension in traveling sheet material comprising a horizontally rotatable support, an elongated lower frame pivotally supported upon the horizontally pivotal support at approximately its midpoint below the path of travel of the sheet material whereby the frame may oscillate in a vertical plane and rotate in a horizontal plane, a horizontally rotatable turntable supported at each end of the lower frame, a pair of freely rotatable rollers supported on each turntable, an elongated upper frame positioned above the proposed path of sheet material travel, a horizontally rotatable turntable depending from each end of the upper frame, a freely rotatable roller supported by each turntable, means secured to at least one of the fames for urging the frames together with said rollers at the ends of the top and bottom frame being adapted to oppose one another whereby the rollers are urged against one another to firmly nip the sheet material traveling therebetween, means to vertically oscillate the frames as a unit when the rolls are in nip position. and means to measure the frequency of oscillation of the frames, the frequency of oscillation giving an indication of the tension in the travelling sheet.

7. Apparatus for measuring tension in traveling sheet material according to claim 6 wherein the means for urging the frames together comprises at least one magnet.

8. Apparatus for measuring tension in traveling sheet material according to claim 6 wherein the means for urging the frames together comprises a coiled compression spring secured to the upper frame, and a support positioned above the upper frame to which the coiled spring is secured at its opposite end.

References Cited in the file of this patent

UNITED STATES PATENTS

| | | |
|---|---|---|
| 2,100,653 | Umansky | Nov. 30, 1937 |
| 2,618,970 | Hitchcock et al. | Nov. 25, 1952 |

FOREIGN PATENTS

| | | |
|---|---|---|
| 550,592 | Germany | May 18, 1932 |
| 1,065,460 | France | Jan. 13, 1954 |